(12) United States Patent
Chen et al.

(10) Patent No.: US 7,997,551 B2
(45) Date of Patent: Aug. 16, 2011

(54) MOUNTING APPARATUS FOR ELECTRONIC DEVICE

(75) Inventors: Yun-Lung Chen, Taipei Hsien (TW); Nian-Yuan Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 48 days.

(21) Appl. No.: 12/603,662

(22) Filed: Oct. 22, 2009

(65) Prior Publication Data
US 2011/0001027 A1    Jan. 6, 2011

(30) Foreign Application Priority Data
Jul. 3, 2009  (CN) .......................... 2009 1 0303988

(51) Int. Cl.
*A47F 5/00*    (2006.01)
(52) U.S. Cl. ..................................... 248/309.1; 248/917

(58) Field of Classification Search ............... 248/309.1, 248/313, 316.4, 917; 361/679.42, 679.43
See application file for complete search history.

(56) References Cited

U.S. PATENT DOCUMENTS

| | | | |
|---|---|---|---|
| 7,780,125 B2 * | 8/2010 | Yen et al. .................... | 248/125.1 |
| 2006/0175476 A1 * | 8/2006 | Hasegawa et al. ......... | 248/125.1 |
| 2006/0219849 A1 * | 10/2006 | Chiu ........................... | 248/125.8 |

* cited by examiner

*Primary Examiner* — Ramon Ramirez
(74) *Attorney, Agent, or Firm* — D. Austin Bonderer

(57) ABSTRACT

A mounting apparatus includes a support member, a latch member, an operating member and a positioning member. The latch member is slidable on the support member between a locked position, where the latch member is capable of securing an electronic device on the support member, and an open position, where the latch member is capable of disengaging from the electronic device. The operating member is slidable on the support member between a first position, where the operating member slides the latch member to the open position, and a second position, where the operating member slides the latch member to the locked position. The positioning member is engageable with the operating member and capable of retaining the operating member in the first position or the second position.

20 Claims, 9 Drawing Sheets

MOUNTING APPARATUS FOR ELECTRONIC DEVICE

BACKGROUND

1. Technical Field

The present disclosure relates to mounting apparatuses, and particularly to a mounting apparatus for securing an electronic device.

2. Description of Related Art

A thin client host is conventionally placed on a desk. However, in many circumstances, a user may need the space on the desk for some other purpose or just prefer to keep the desk as clear as possible. Sometimes, convenient placement of the thin client host is not possible and it will be inconvenient to do things such as, for example, plugging or unplugging connectors or cards to/from the thin client host.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
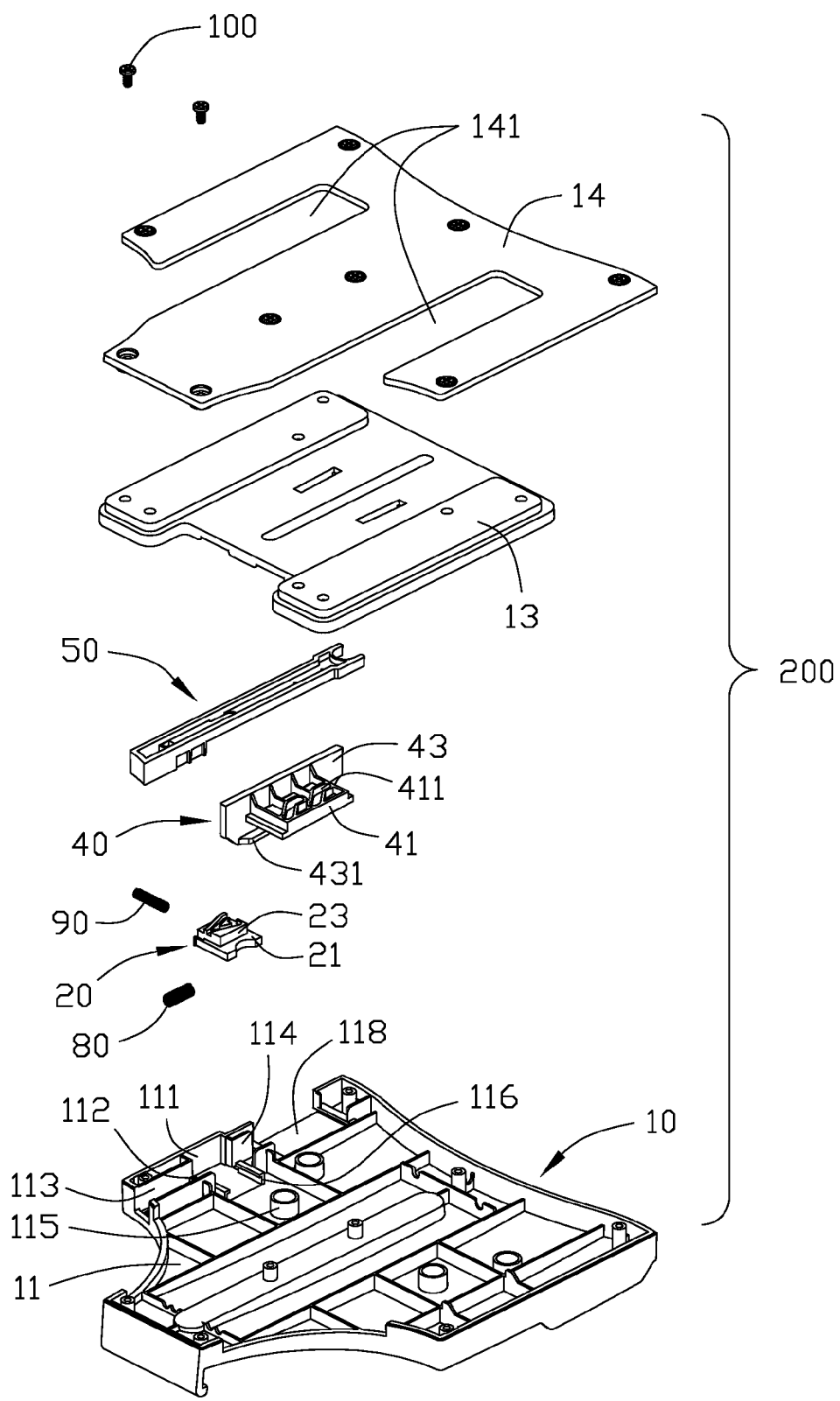
FIG. 1 is an exploded, isometric view of a mounting apparatus in accordance with an embodiment.
Figure 2:
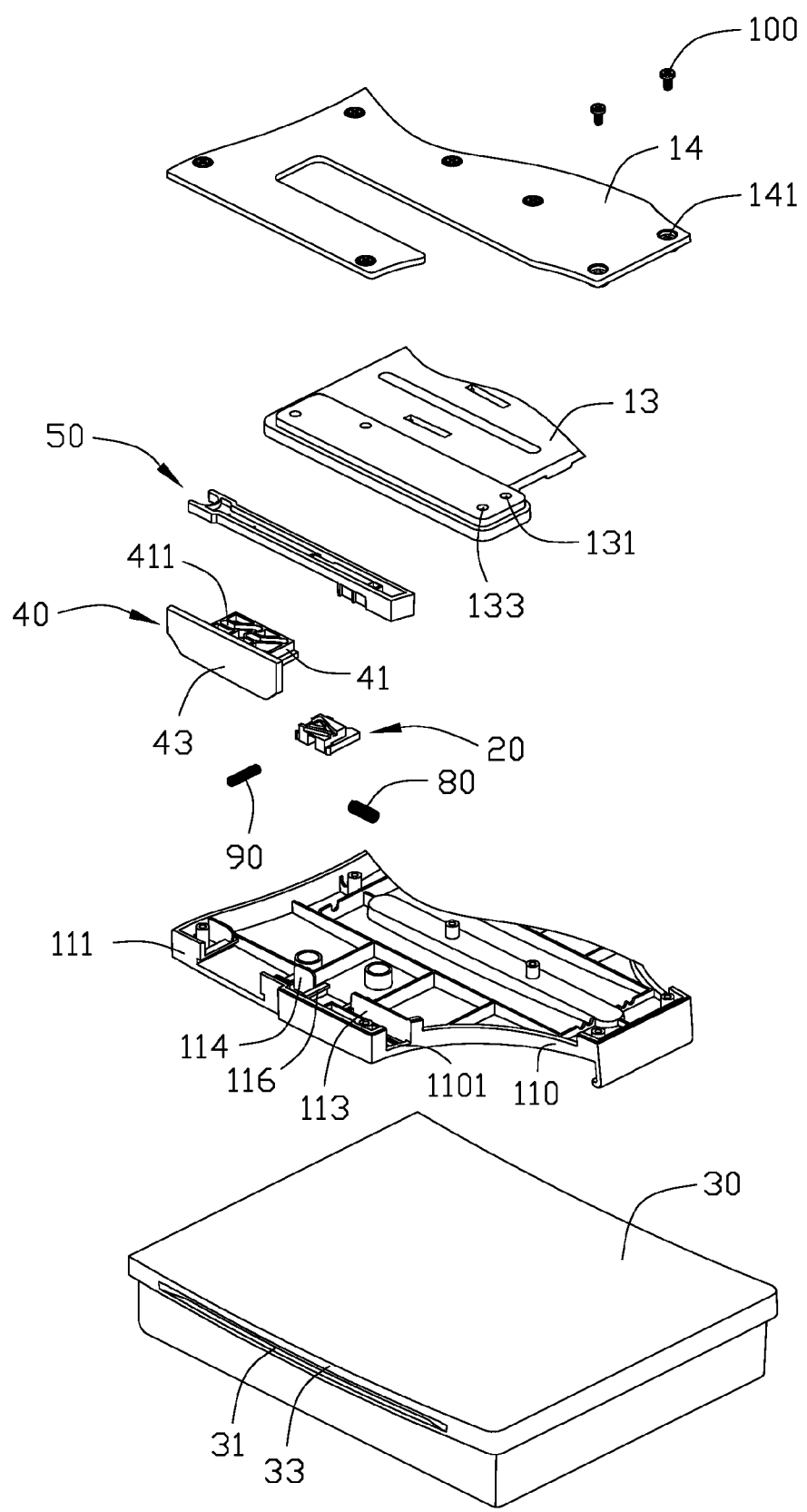
FIG. 2 is similar to FIG. 1, but showing another aspect, and further showing an electronic device.

Referring to FIGS. 1, 2, a mounting apparatus in accordance with an embodiment includes a bracket 200. The bracket 200 is configured to secure on a display 70 (shown in FIG. 9), and configured to secure an electronic device 30 thereon. The electronic device 30 may be, for example, a thin client host, or other electronic devices that defines a locking slot 31 in a wall 33.

The bracket 200 includes a support member 10, a moveable positioning member 20, a moveable latch member 40, a moveable operating member 50, a sliding member 13, and a cover 14.

The support member 10 includes a bottom wall 11, a fist sidewall 110, and a second sidewall 111 contacting with the first sidewall 110. The first and second sidewalls 110, 111 located on the bottom wall 11. A cutout 1101 is defined in the first sidewall 110. A pair of first flanges 113 and a pair of second flanges 114 are located on the bottom wall 11 and parallel to the second sidewall 111, so as to form a receiving slot (not labeled) to communicate with the cutout of 1101 of the first sidewall 110. A positioning tab 112 (also shown in FIG. 7) is located between the fist flanges 113 adjacent the second flanges 114. A pair of guideways 116 is located on the bottom wall 11 between the first and second flanges 113, 114 perpendicular to the first and second flanges 113, 114. The positioning tab 112 and the guideways 116 are shorter than the first and second flanges 113, 114. An access 118 is defined in the second sidewall 111 in back of the second flanges 114.

Figure 3:
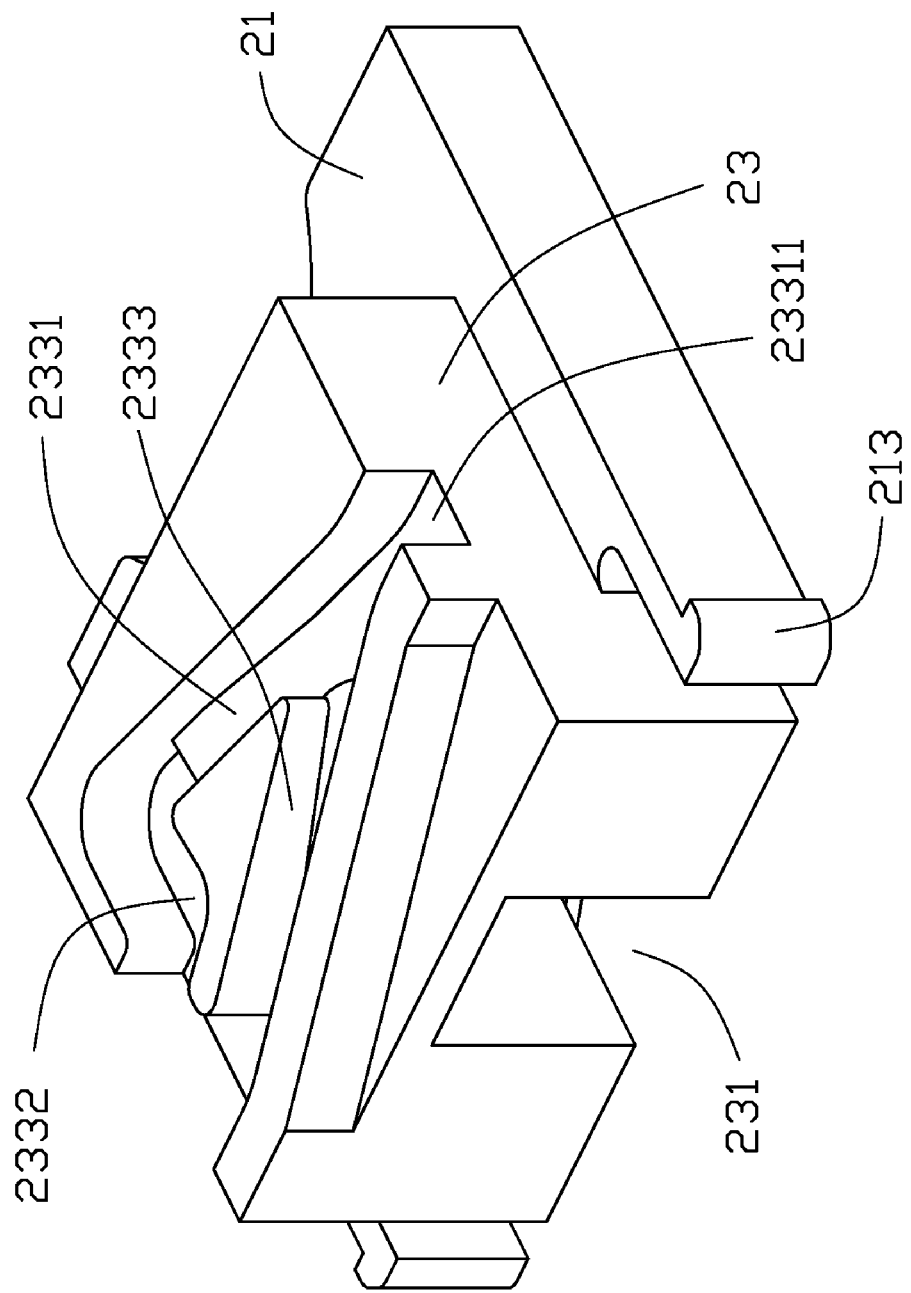
FIG. 3 is an isometric view of a positioning member of FIG. 1.

Referring also to FIG. 3, the positioning member 20 includes a base portion 21 slidably secured between the guideways 116, and a positioning portion 23 located on the base portion 21. A first receiving slot 2331, a second receiving slot 2332, a third receiving slot 2333 are defined in the positioning portion 23. The first receiving slot 2331 communicates with outside of the positioning portion 23, and includes an entry 23311. The first receiving slot 2331 communicates with the second receiving slot 2332, and where the two slots meet the second receiving slot 2332 is deeper than the first receiving slot 2331. The third receiving slot 2333 communicates with the first receiving slot 2331, and where the two slots meet the first receiving slot 2331 is deeper than the third receiving slot 2333. A holding slot 231 is defined in the positioning member 20. A pair of resiliently deformable hooks 213 is formed on the base portion 21, for engaging with the guideways 116 of the support member 10.

Referring to FIGS. 1-2, the latch member 40 includes a base body 43 and a driving portion 41 located on the base body 43. A latch flange 431 is located on the base body 43 below the driving portion 41. The driving portion 41 is configured to be slidably received in the access 118 of the support member 10. Two sliding slots 411 each with first and second ends are defined in the driving portion 41.

Figure 4:
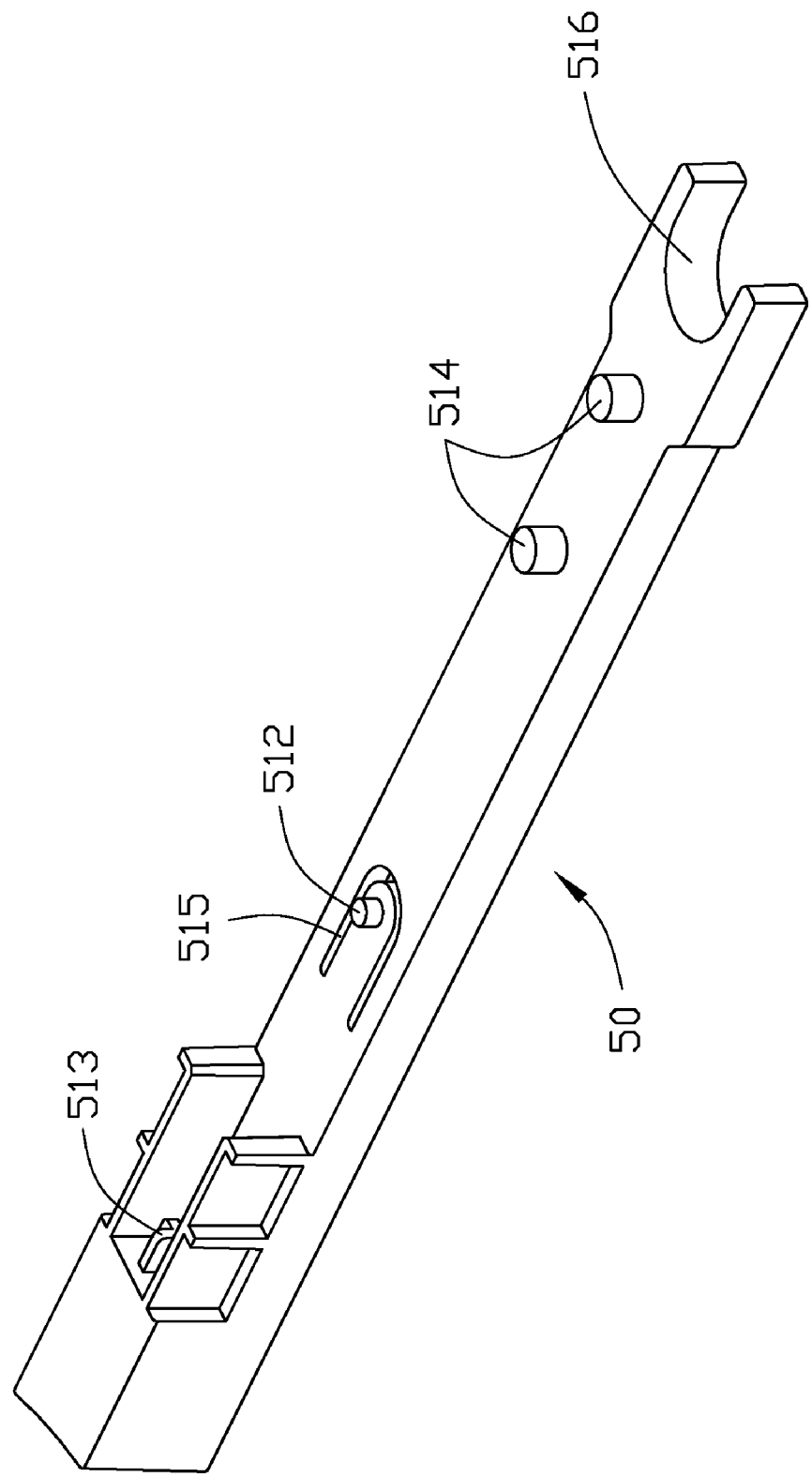
FIG. 4 is an isometric view of an operating member of FIG. 1.

Referring also to FIG. 4, a tab 513 is located on the operating member 50 at one end thereof. A resilient portion 515 is located on the operating member 50 in a middle portion thereof. A first post 512 is located on the resilient portion 515. Two second posts 514 are located on the operating member 50 at an opposite end of the operating member 50. The first post 512 and the second posts 514 extend in a direction perpendicular to an extending direction of the tab 513. A cutout 516 is defined an end of the operating member 50.

Referring to FIGS. 1-2, the sliding member 13 is slidably secured on the support member 10. The cover 14 is fixed on the support member 10, and defines two openings 141.

Referring also to FIG. 5-8, during assembly, the base portion 21 of positioning member 20 is engaged in the guideways 116 of the support member 10. The hooks 213 are positioned between the second sidewall 111 and the guideways 116, and configured to engage with the guideways 116 to prevent the positioning member 20 from moving out of the guideways 116. A first spring member 90 is located between the second sidewall 111 and the positioning member 20, and received in the holding slot 231 of the positioning member 20.

The driving portion 41 of the latch member 40 is placed in the access 118, and the latch flange 431 is positioned outside of the support member 10. The operating member 50 is placed between the first flanges 113 and the second flanges 114 on the positioning member 20 and the driving portion 41 of the latch member 40. A second spring member 80 is engaged with the tab 513 of the operating member 50 and the positioning tab 112 of the support member 10. The first post 512 is engaged in the one of the access 2330, the first receiving slot 2331, the second receiving slot 2332, and the third receiving slot 2333. The second posts 514 are engaged in the sliding slots 411.

The sliding member 13 is positioned in the support member 10 on one side of the operating member 50. The cover 14 is fixed on the support member 10 above the operating member 50 and the sliding member 13 with fasteners 100. The sliding member 13 is exposed out of the cover 14 via the openings 141.

Figure 5:
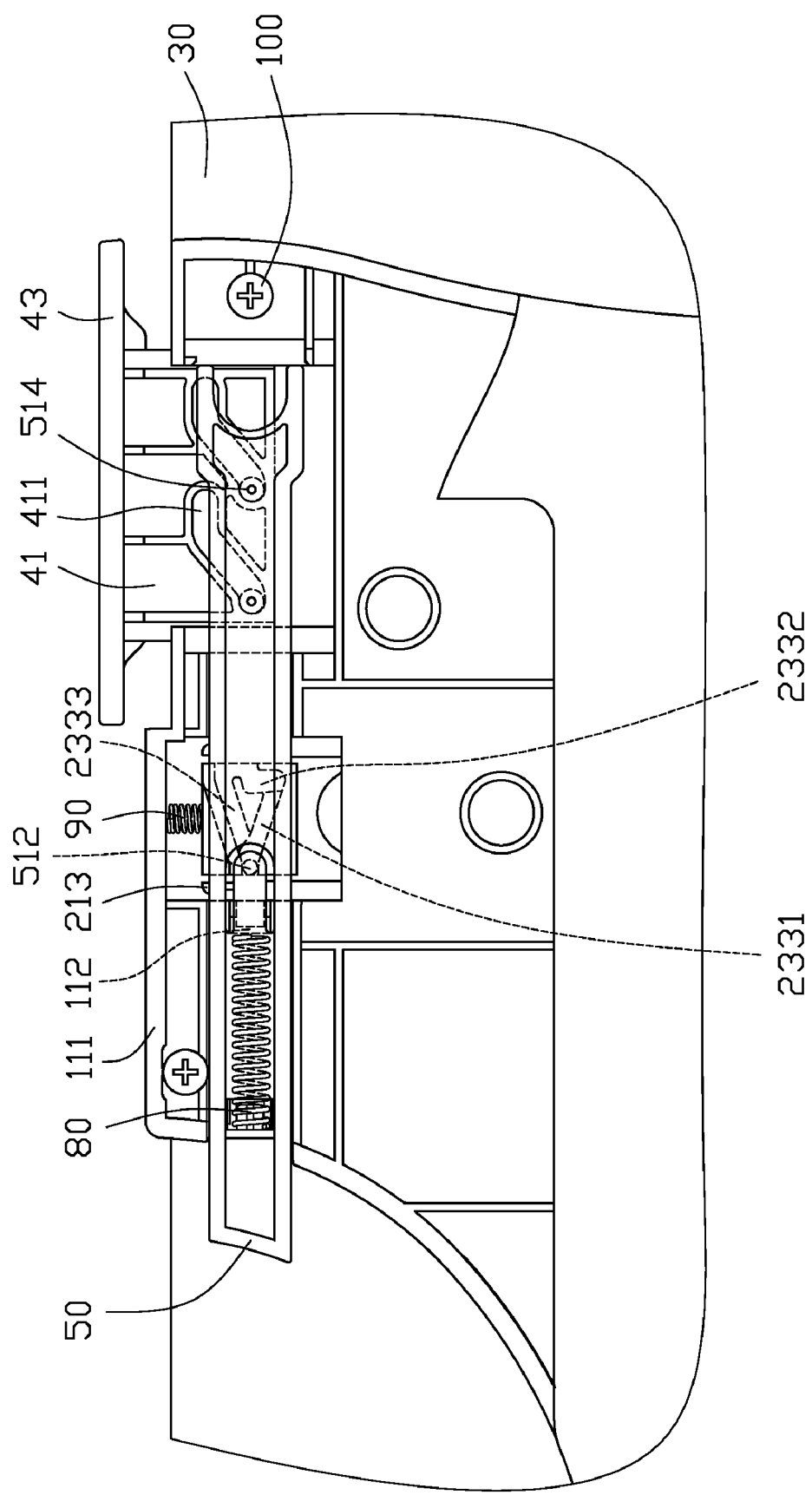
FIG. 5 is a cutaway view of an assembly of the mounting apparatus of FIG. 1, showing the operating member positioned in a first position.

Referring also to FIG. 5, the operating member has a first position, where the first post 512 is positioned in the entry 23311 of the first receiving slot 2331, and the second posts 514 are positioned in first ends of the receiving slots 40 away from the base body 43 of the latch member 40. The latch member 40 has an open position where the base body 43 is positioned outside the supporting member 10.

Figure 6:
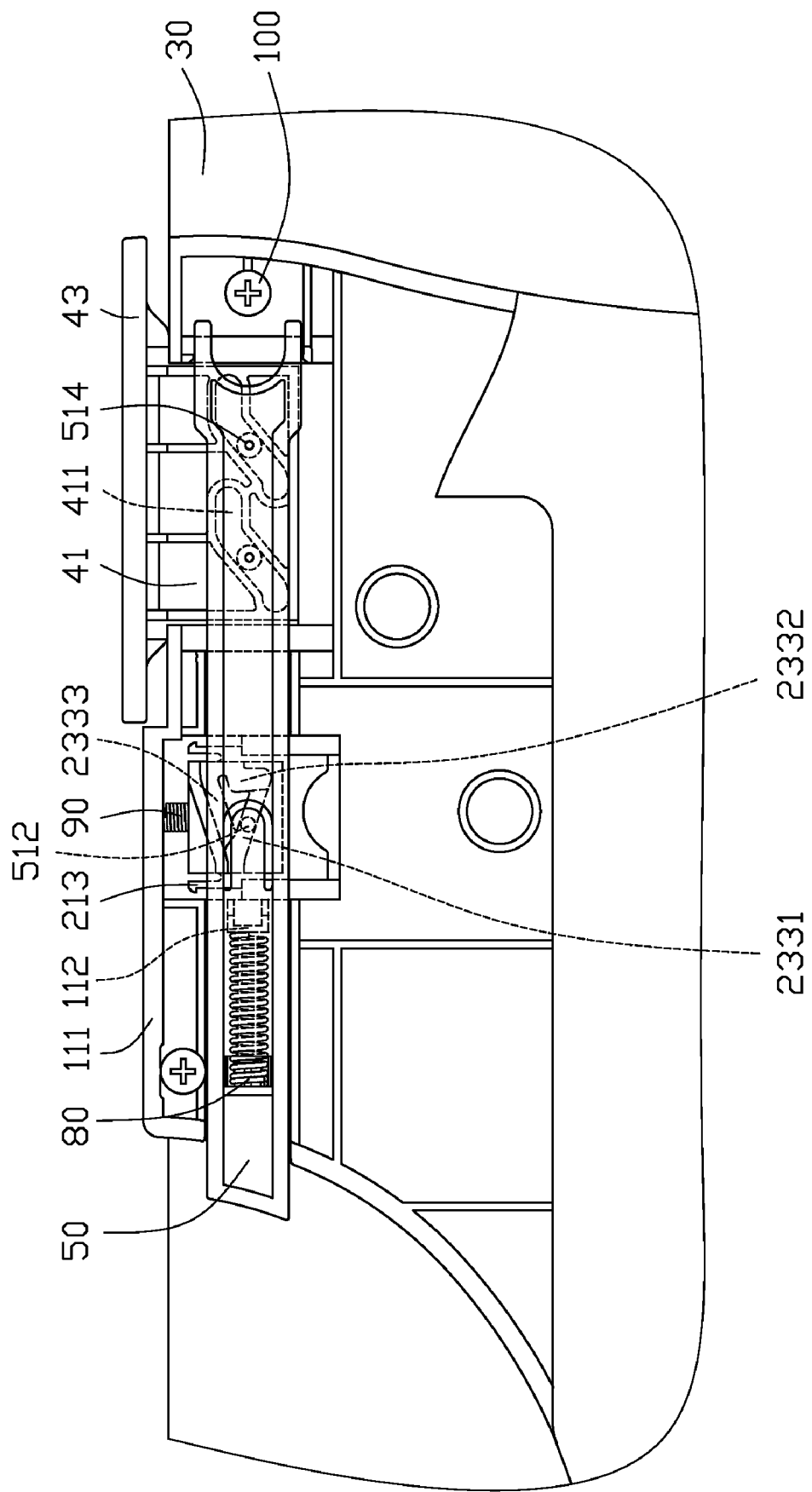
FIG. 6 is similar to FIG. 5, but showing the operating member positioned in a position between the first position and a second position.

Referring to FIG. 6, the operating member 50 is pushed to slide in the support member 10. The second spring member 80 is resiliently deformed between the operating member 50 and the positioning tab 112 of the support member 10. Because the first receiving slot 2331 is deeper than the third receiving slot 2333 where they meet, the first post 512 is blocked from sliding in the third receiving slot 2333, but slides in the first receiving slot 2331. The positioning member 20 is pushed by the first post 512 to slide towards the second sidewall 111, and thereby to resiliently deform the first spring member 90. A sliding direction of the positioning member 20 is substantially perpendicular to a sliding direction of the operating member 50. The second posts 514 are slid in the sliding slots 411 towards the second ends adjacent the base body 41, so as to slide the latch member 40 towards in a locked position, where the base body 43 of latch member 40 is positioned in the support member 10. A sliding direction of the latch member 40 is substantially perpendicular to the direction of the operating member 50.

Figure 7:
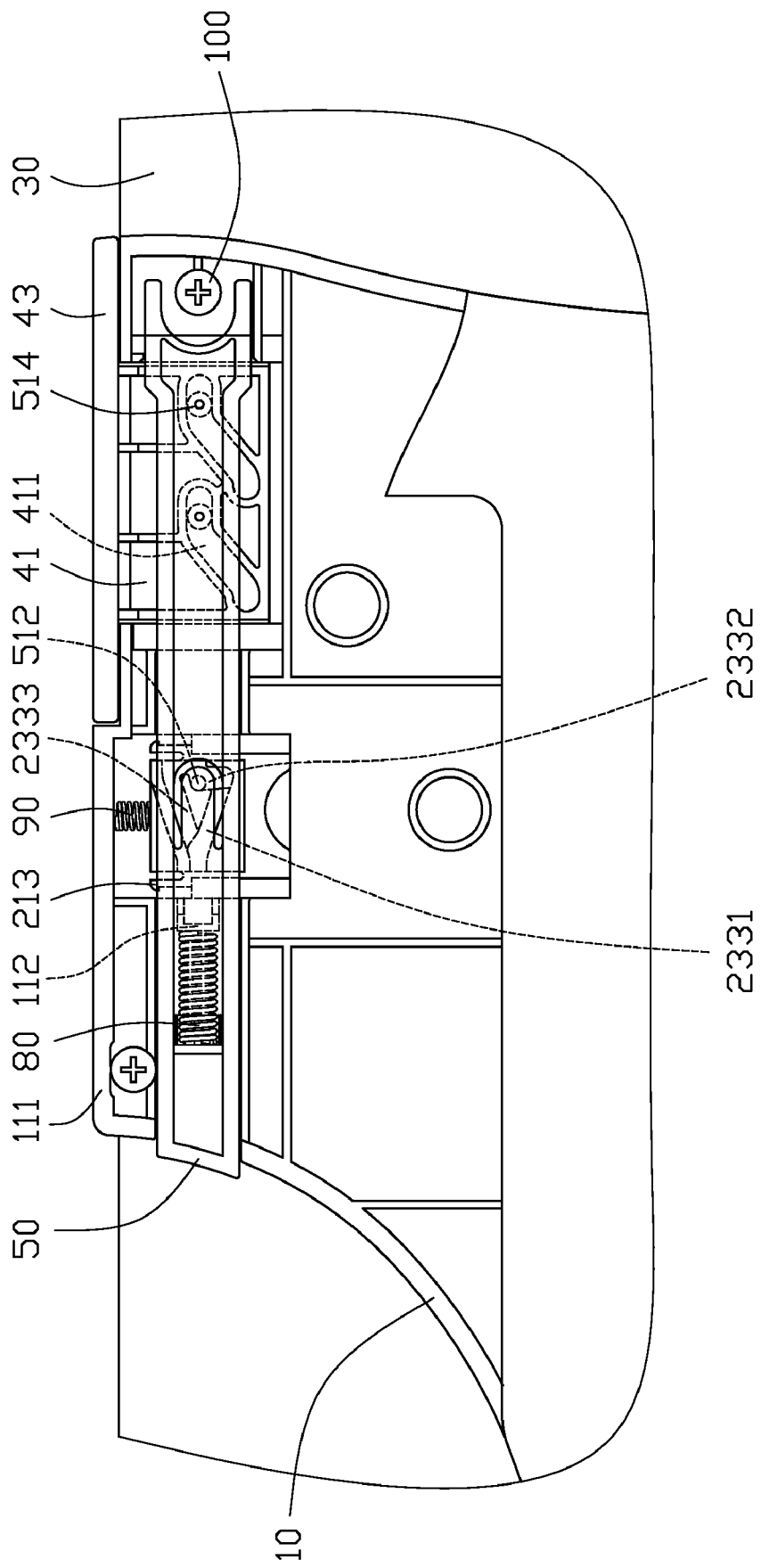
FIG. 7 is similar to FIG. 5, but showing the operating member positioned in the second position.

Referring to FIG. 7, the operating member 50 is positioned in a second position, where the first post 512 is slid from the first receiving slot 2331 to the second receiving slot 2332, and blocked by the second receiving slot 2332. The second spring member 80 is further resiliently deformed relative to the first position. The first spring member 90 rebounds relative to the first position, but is still resiliently deformed by the positioning member 20. The second posts 514 are positioned in the second ends of the sliding slots 411 of the latch member 40 so as to position the latch member in the locked position.

Figure 8:
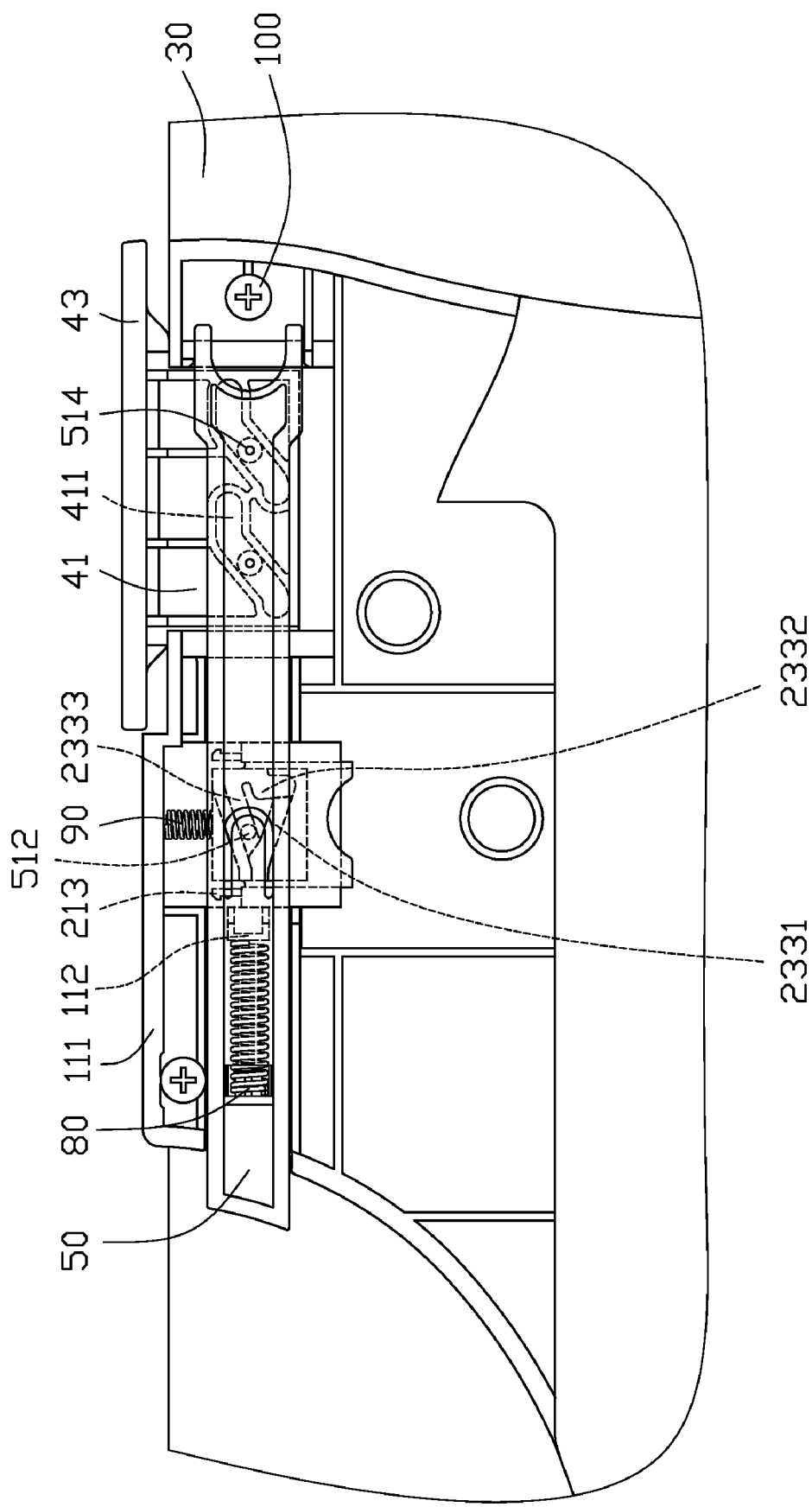
FIG. 8 is similar to FIG. 5, but showing the operating member positioned in a position between the second position and the first position.

Referring also to FIG. 8, the operating member 50 is further pushed to release from the second receiving slot 2332, the first spring member 90 rebounds to slide the positioning member 20 until the hooks 213 of the positioning member 20 engage with the guideways 116 of the support member 10. Then the operating member 50 is released. The second spring member 80 rebounds to slide the operating member 50 to the first position. The first post 512 is slid in the third receiving slot 2333. The second posts 514 are slid in the sliding slots 411 from the second ends to the first ends, so as to slide the latch member 40 from the locked position to the open position.

Figure 9:
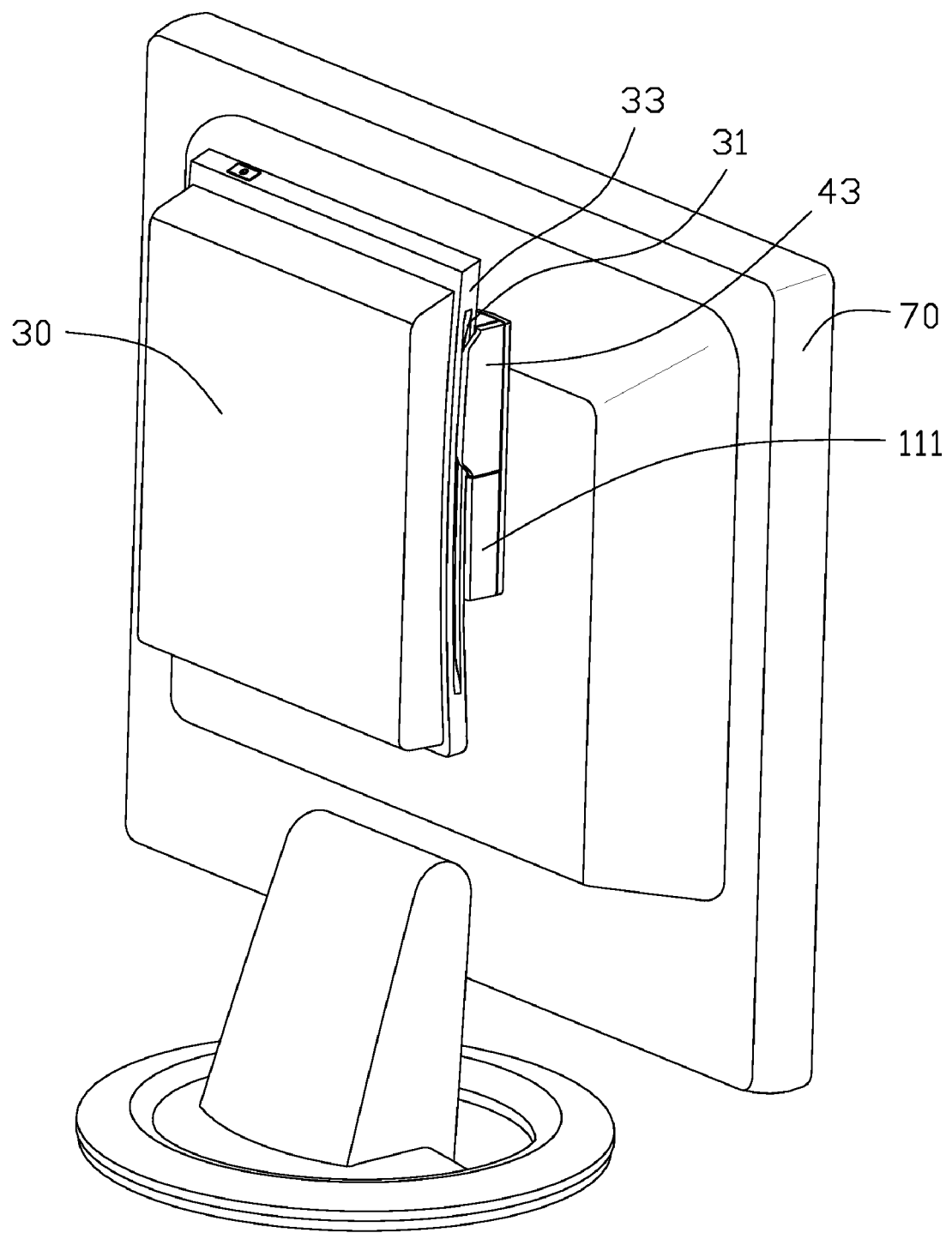
FIG. 9 is assembled view of the mounting apparatus of FIG. 1 with the electronic device of FIG. 2 and a display.

Referring also to FIG. 9, the sliding member 13 is fixed on a display. An electronic device 30 can be placed on the support member 10 when the latch member 40 is in the open position, and secured on the support member 10 when the latch member 40 is in the locked position. The latch flange 431 is received in the locking slot 31 of the electronic device 30.

In addition, during the sliding of the first post 512 in the first to third sliding slots 2331, 2332, 2333, the resilient portion 515 of the operating member 50 can be resiliently deformable because the positioning portion 23 of the positioning member 20 urges against the first post 512.

It is to be understood, however, that even though numerous characteristics and advantages have been set forth in the foregoing description of embodiments, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus comprising:
a support member;
a latch member slidable on the support member between an open position, where a space is located between the latch member and the support member, and a locked position, where the latch member abuts the support member and covers the space;
an operating member slidable on the support member between a first position where the operating member slides the latch member to the open position, and a second position where the operating member slides the latch member to the locked position; and
a positioning member engageable with the operating member and capable of retaining the operating member in the first position or the second position.

2. The mounting apparatus of claim 1, wherein a sliding direction of the latch member is perpendicular to that of the operating member.

3. The mounting apparatus of claim 1, wherein the positioning member is slidable on the support member, and a sliding direction of the positioning member is perpendicular to that of the operating member.

4. The mounting apparatus of claim 1, wherein a first spring member is located between the support member and the positioning member to bias the positioning member so that the operating member is urged from first position to the second position.

5. The mounting apparatus of claim 4, wherein a second spring member is located between the support member and the operating member to bias the operating member from towards the first position.

6. The mounting apparatus of claim 5, wherein the positioning member defines a first receiving slot, a second receiving slot and the third receiving slot; the operating member comprises a first post that is slidable in the first, second and third receiving slots.

7. The mounting apparatus of claim 6, wherein when the operating member is slidable from the first position where the first post is in the first receiving slot, to the second position where the first post is in the second receiving slot and the first spring member is resiliently deformed by the positioning member.

8. The mounting apparatus of claim 7, wherein the operating member is capable of disengaging the first post from the second receiving slot, so that the first spring member rebounds to slide the positioning member and the second spring member rebounds to slide the operating member from the second position to the first position; the first post is slidable from the second receiving slot, and the third receiving slot to the first receiving slot when the operating member is slid from the second position to first position.

9. The mounting apparatus of claim 6, wherein the first post is engageable in the second receiving slot capable of blocking the positioning member from sliding to retain the operating member in the second position.

10. The mounting apparatus of claim 6, wherein the first receiving slot is deeper than the third receiving slot at a junction thereof.

11. The mounting apparatus of claim 6, wherein the second receiving slot is deeper than the second receiving slot at a junction thereof.

12. The mounting apparatus of claim 1, wherein a pair guideways is located on the support member; two hooks are disposed on the positioning member to engage with the guideways so as to prevent the positioning member from disengaging from the guideways.

13. The mounting apparatus of claim 1, wherein the latch member defines a sliding slot; and the operating member comprises a second post that is configured to slide in the sliding slot and actuate the latch member.

14. A mounting apparatus comprising:
a support member;
a latch member slidable on the support member between an open position, where a space is located between the latch member and the support member, and a locked position where the latch member abuts the support member and covers the space;
an operating member attached on the support member, the operating member sliding the latch member between the open position and the locked position; and
a positioning member engageable with the operating member and capable of retaining the latch member in the locked position.

15. The mounting apparatus of claim 14, wherein a first spring member is located between the support member and the positioning member and biases the positioning member from a first position, where the operating member slides the latch member to the open position, to a second position, where the operating slides the latch member to the locked position.

16. The mounting apparatus of claim 15, wherein a second spring member is located between the support member and the operating member to bias the operating member towards the first position.

17. The mounting apparatus of claim 15, wherein the positioning member defines a first receiving slot, a second receiving slot and a third receiving slot; the operating member comprises a first post that is slidable in first, second and third receiving slots.

18. The mounting apparatus of claim 15, wherein the first receiving slot is deeper than the third receiving slot at a junction thereof.

19. The mounting apparatus of claim 15, wherein the first post is engageable in the second receiving slot capable of blocking the positioning member from sliding when the operating member is in the second position.

20. The mounting apparatus of claim 14, wherein the latch member defines a sliding slot; and the operating member comprises a second post that is configured to slide in the sliding slot and actuate the latch member when the latch member is slidable between the open position and the locked position.

* * * * *